United States Patent
Fölmli et al.

(10) Patent No.: US 9,308,965 B2
(45) Date of Patent: Apr. 12, 2016

(54) ELECTRIC WHEEL HUB DRIVE FOR A VEHICLE, IN PARTICULAR A BICYCLE, INCLUDING A STATOR WITH AN IRONLESS HOLLOW CYLINDRICAL STATOR WINDING

(75) Inventors: Franz-Xaver Fölmli, Oberdorf (CH); Mathis Trachsel, Lucerne (CH); David Ramon, Caslano (CH); Hugo Fritschy, Sachseln (CH); Raniero Pittini, Hergiswil (CH)

(73) Assignee: MAXON MOTOR AG, Sachseln (CH)

( * ) Notice: Subject to any disclaimer, the term of this patent is extended or adjusted under 35 U.S.C. 154(b) by 218 days.

(21) Appl. No.: 13/594,390

(22) Filed: Aug. 24, 2012

(65) Prior Publication Data

US 2013/0049549 A1 Feb. 28, 2013

(30) Foreign Application Priority Data

Aug. 25, 2011 (EP) .................................... 11006956

(51) Int. Cl.
| | |
|---|---|
| H02K 7/10 | (2006.01) |
| B62J 6/12 | (2006.01) |
| B62M 6/65 | (2010.01) |
| B62M 7/12 | (2006.01) |
| B62M 11/16 | (2006.01) |
| B62M 23/02 | (2010.01) |
| B60L 11/00 | (2006.01) |

(52) U.S. Cl.
CPC ................ *B62M 6/65* (2013.01); *B60L 11/007* (2013.01); *B62M 7/12* (2013.01); *B62M 11/16* (2013.01); *B62M 23/02* (2013.01); *B60L 2200/12* (2013.01); *B60L 2220/16* (2013.01); *B60L 2220/44* (2013.01); *B60L 2240/425* (2013.01); *Y02T 10/642* (2013.01)

(58) Field of Classification Search
CPC ......... H02K 3/47; H02K 7/10; H02K 7/1116; B62J 6/12
USPC .................................. 310/67 A, 68 C, 99, 100
See application file for complete search history.

(56) References Cited

U.S. PATENT DOCUMENTS

| | | | |
|---|---|---|---|
| 5,581,136 A * | 12/1996 | Li ................................ | 310/67 R |
| 6,131,683 A | 10/2000 | Wada | |
| 6,355,996 B1 * | 3/2002 | Birkestrand ................ | 310/67 A |

(Continued)

FOREIGN PATENT DOCUMENTS

| | | |
|---|---|---|
| CN | 2 727 041 Y | 9/2005 |
| CN | 101 311 021 A | 11/2008 |

(Continued)

OTHER PUBLICATIONS

Machine translation of JP 2005278234 a (published Oct. 2005).*

(Continued)

*Primary Examiner* — Michael Andrews
(74) *Attorney, Agent, or Firm* — Buchanan Ingersoll & Rooney PC

(57) ABSTRACT

The invention relates to an electric wheel hub drive for a vehicle, in particular a bicycle. The wheel hub drive comprises a hub housing that is pivot-mounted about an axis and a brushless electric motor coaxially arranged with regard to the axis and including a rotor and a stator for driving the hub housing. The rotor of the electric motor includes at least one permanent magnet. According to the invention, the stator includes an ironless stator winding.

14 Claims, 1 Drawing Sheet

(56) References Cited

U.S. PATENT DOCUMENTS

| | | |
|---|---|---|
| 2001/0011854 A1* | 8/2001 | Heyden et al. ............... 310/254 |
| 2003/0047369 A1* | 3/2003 | Katagiri et al. ............... 180/206 |
| 2005/0264111 A1 | 12/2005 | Tanaka et al. |
| 2005/0264112 A1 | 12/2005 | Tanaka et al. |
| 2005/0285461 A1* | 12/2005 | Kitamura et al. ........... 310/67 A |
| 2006/0065452 A1 | 3/2006 | Tomoshige et al. |
| 2008/0020887 A1* | 1/2008 | Moeller ..................... 310/68 C |
| 2008/0070736 A1 | 3/2008 | Yoshino et al. |
| 2008/0308336 A1 | 12/2008 | Van Rooij |
| 2010/0194231 A1* | 8/2010 | Rippel et al. ................. 310/213 |
| 2010/0264755 A1* | 10/2010 | Widdowson et al. ...... 310/12.05 |

FOREIGN PATENT DOCUMENTS

| | | | |
|---|---|---|---|
| CN | 102139737 A | 8/2011 | |
| EP | 1 601 083 A1 | 11/2005 | |
| EP | 1 601 085 A1 | 11/2005 | |
| EP | 1 640 261 A2 | 3/2006 | |
| EP | 1 736 347 A1 | 12/2006 | |
| JP | 2005/278234 A | 10/2005 | |
| JP | 2005278234 A * | 10/2005 | ............. H02K 9/06 |
| JP | 2009-090982 A | 4/2009 | |
| WO | WO 2007/083995 A1 | 7/2007 | |

OTHER PUBLICATIONS

European Search Report for 11006956.4 dated Oct. 31, 2011.
Oct. 27, 2015 Chinese Office Action issued in Chinese Application No. 201210306515.5 (with English language translation).

* cited by examiner

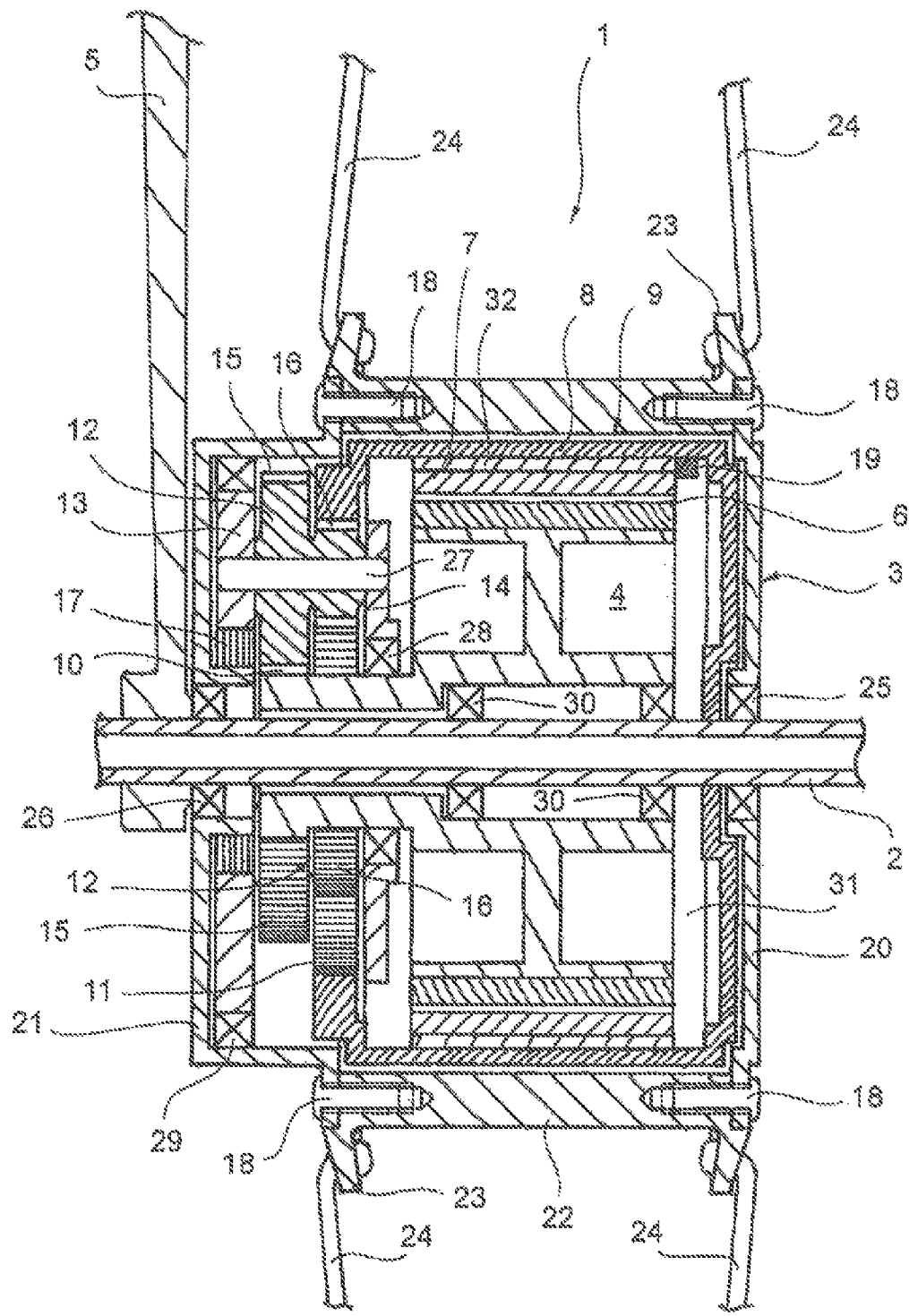

ELECTRIC WHEEL HUB DRIVE FOR A VEHICLE, IN PARTICULAR A BICYCLE, INCLUDING A STATOR WITH AN IRONLESS HOLLOW CYLINDRICAL STATOR WINDING

The present invention relates to an electric wheel hub drive for a vehicle, in particular a bicycle, according to the preamble of independent claim 1. The wheel hub drive comprises a hub housing which is pivot-mounted about an axis. The wheel hub drive further comprises a brushless electric motor arranged coaxially with regard to the axis and including a rotor and a stator, wherein the electric motor is provided for driving the hub housing. In case of such brushless electric motors, an alternating magnetic field is generated by means of stator coils. In contrast thereto, the rotor does not have any winding but one or a plurality of permanent magnets interacting with the alternating magnetic field of the stator in such a manner that the rotor starts rotating.

Such electric wheel hub drives are known from the prior art and are used, for instance, as auxiliary drives for bicycles. Most diverse requirements are put on such wheel hub drives. Usually, the hub housing and the electric motor are coaxial with regard to each other, the motor and, where applicable, an interposed gear system being enclosed by the hub housing. Hence follows that, at first, there is only little space available for the motor and the gear system which means that the wheel hub drive has to deliver a relatively high power at a minor structural size. Beyond that, customers still are expecting that the torques of such wheel hub drives increase even more. Direct high-torque drives can be realized only if the electric motor is of relatively large size in the radial direction. To obtain a high torque with electric motors or wheel drive hubs that are small in the radial direction, planetary gear systems are used that are connected or posed between electric motor and hub housing. In case of high-performance drives, a relatively large amount of waste heat is usually produced. Such waste heat has to be dissipated outwards in order to prevent any damages of the motor or the interior of the wheel hub drive, in particular the gear system.

An electric wheel hub drive of the kind as mentioned above is known, e.g. from EP 1 601 083 A1, EP 1 601 085 A1 and from EP 1 640 261 A1. All of said three documents disclose a wheel hub drive in which the electric motor and the gear system are enclosed by the hub housing. The rotor of the electric motor has been designed as an internal rotor and includes at its outer circumference a ring of permanent magnets arranged to one other in a row and being alternately oppositely poled. The alternating magnetic field is generated in the stator of the electric motor. To this end, the stator comprises hollow-cylindrical stacks of sheet by which the rotor is enclosed. A plurality of poles of said stacks of sheet is distributed in circumferential direction and wound up with stator windings to which power can alternately be applied. In EP 1 601 083 A1 it is referred to the problem of heat dissipation. According to said document, it is already known to provide a cooling liquid between a housing of the electric motor and the hub housing which may be favorable for dissipating heat from the stator of the electric motor. EP 1 601 083 A1 however states that such kind of cooling causes an increased effort, as the cooling liquid would, on the one hand, have to be introduced into the hub housing and, on the other hand, have to be safely encapsulated therein. Accordingly, EP 1 601 083 A1 suggests to arrange the stator at the side so that no motor housing has to be provided. Thus, the waste heat developing in the stator might be dissipated outwards more easily. In contrast thereto, EP 1 640 261 A1 suggests to provide the hub housing with an air pump for supplying environmental air through the hub housing for cooling the electric motor.

Wheel hub drives of the kind as mentioned above are further known from the EP 1 736 347 A1 and from the WO 2007/083995 A1. Also in case of the wheel hub drives described in these two specifications, the electric motor and the gear system are enclosed by the hub housing. However, the rotor of said electric motor has been designed as an exterior rotor. This means, the stator is arranged within a hollow-cylindrical rotor. In case of such a design with an exterior rotor the waste heat arising in the stator can be dissipated to the outside even worse. Accordingly, such a drive can usually not be designed as powerful as the above-described wheel hub drives with internal rotor.

A wheel hub drive integrated into the rim of a vehicle is also known from the US 2008/0070736 A1. The drive comprises an alternating power motor with exterior stator and internal rotor, the stator diameter corresponding to the rim diameter. Owing to the relatively large outer stator circumference, a very large area for dissipating heat has, thus, been made available. However, the drive has, thus, become very large in the radial direction and is therefore not suited e.g. for an auxiliary bicycle drive.

It is the object of the present invention to provide a wheel hub drive which has been improved with regard to the prior art, wherein, although small-dimensioned, high performance and high torque are made available with sufficient heat dissipation being ensured at the same time. Furthermore, it is the object of the present invention to improve the efficiency of the wheel hub drive. Beyond that, the wheel hub drive should be as lightweight as possible.

The object is solved by the features of independent claim 1. According thereto, the object is solved in accordance with the invention when the stator is provided with an ironless stator winding. It has, thus, become possible to provide for a wheel hub drive of high performance and high torque with comparatively minor waste heat being generated. The ironless stator winding according to the invention offers a plurality of advantages. On the one hand, no core loss arises, i.e. no hysteresis loss and no eddy power loss as well as no residual loss, so that there is less waste heat and increased efficiency. Moreover, an electric motor with ironless winding is resistant to overload and is highly efficient especially when overloaded. Hence follows that, for instance when starting or driving steep grades, an especially high torque can be provided. Enhancing the overload capacity requires a high degree of heat dissipation. This has been ensured for the wheel hub drive according to the invention. On the other hand, the weight of the wheel hub drive has been reduced which is advantageous particularly for bicycles equipped with a wheel hub drive according to the invention. Finally, the wheel hub drive according to the invention is even less noisy than a comparable wheel hub drive with stacks of sheet. Preferably, the rotor of the electric motor has multiple poles. This means, a plurality of permanent magnets are provided which are circumferentially arranged and alternately oppositely poled. The stator winding preferably also has multiple poles and circumferentially includes a plurality of windings overlapping each other and being alternately supplied with power by means of an electronic system. The stator is non-rotatably mounted to the axis.

Advantageous embodiments of the present invention are the subject matters of the sub-claims.

In an especially preferred embodiment of the present invention, a planetary gear system is connected between the electric motor and the hub housing, which, at the driving end, is coupled to the rotor and, at the output end, is coupled to the hub housing. Thus, the wheel hub drive can provide for an especially high torque and, nevertheless, can be of utmost compact design.

In another especially advantageous embodiment of the present invention, the ironless stator winding is of hollow-cylindrical design, wherein the rotor is arranged radially within said stator winding as an internal rotor. Owing to the exterior stator, the waste heat can very well be dissipated outwards. Thus, high power consumptions are feasible without causing damage to the electric motor. Preferably, the individual windings of the stator winding overlap each other circumferentially and are epoxy-bonded with each other. Thus, the stator winding is highly cohesive and cannot be deformed, even not in case of strong vibrations.

In still another advantageous embodiment of the present invention, the stator winding is enclosed by a motor housing of the electric motor and connected thereto in a thermo-conductive manner. Preferably, there is direct contact between the stator winding and the motor housing, thus allowing the waste heat dissipating as quickly as possible. This is why the motor housing is preferably made of a material that is particularly effective with regard to thermal conduction. To this end, metals such as steel or aluminum are generally used. Furthermore, a magnetically soft yoke may preferably be provided between stator winding and motor housing. In this case, the yoke lies directly against the motor housing as well as against the stator winding so as to ensure optimal heat dissipation. The yoke is preferably made up of a plurality of annular disc-shaped sheets of magnetically soft steel.

Preferentially, the hub housing is made of an either amagnetic or paramagnetic material. Any core loss developing in the exterior housing can thus be avoided. On the one hand, the efficiency of the wheel hub drive can, thus, be increased and, on the other hand, the developing waste heat can be further diminished. Accordingly, it seems to be suitable to have the hub housing being manufactured of aluminum.

In still another especially advantageous embodiment of the present invention, the electric motor and the planetary gear system are at least partially enclosed by the hub housing. Both the electric motor and the gear system are thus protected against pollution and damages caused by external force effects. Preferably, electric motor and planetary gear system are entirely enclosed by the hub housing. This would be the best possible protection for gear system and motor. Beyond that, said embodiment is visually appealing and able to ensure that e.g. an auxiliary bicycle drive cannot be seen from outside. It may, however, also be provided to have the motor just being partially enclosed by the hub housing, or to have the hub housing being provided with openings in the motor area for enabling cold environmental air to reach the stator or the electric motor housing for cooling the motor.

Furthermore, a thermo-conductive fluid may advantageously be provided in a gap between the motor housing and the hub housing, in order to further improve the dissipation or evacuation of the waste heat developing in the stator of the electric motor. Preferably, both the hub housing and the motor housing are made, at least in the gap area where the thermo-conductive fluid is provided, of a metal of high thermal conductivity. To this end, steel or aluminum is especially suitable. Dissipation of heat can, thus, be further facilitated.

In still another especially preferred embodiment of the present invention, the planetary gear system is a single-stage gear system. Accordingly, the wheel hub drive according to the invention is axially also very short and can be upgraded in the form of an auxiliary drive for existing bicycles having standard fork widths. In case of new bicycles being provided with the wheel hub drive according to the invention, standard components may also be used. The single-stage planetary gear system wheel hub drive according to the invention fits to mountain bike axles of standard length, wherein brake disk and sprocket can also still be located on the same axis. The single-stage planetary gear system includes a sun gear, a ring gear, at least one planet gear meshing with said sun gear and said ring gear as well as a planet carrier for supporting the at least one planet gear. Preferably, a plurality of planet gears is provided which have been evenly distributed over the circumference of the planet carrier.

In a preferred embodiment, the sun gear of the planetary gear system is non-rotatably mounted with the rotor or integrally formed with a rotor shaft of said rotor, the planet carrier forming the planetary gear system output that is coupled to the hub housing. Thus, a compact structural design can be obtained, with a large gear ratio being feasible. Moreover, in this embodiment the wheel hub drive according to the invention can be mounted very easily.

In still another preferred embodiment of the present invention, the ring gear is non-rotatably mounted with the stator. Here, the number of components of the wheel hub drive according to the invention can be reduced when the ring gear is formed by the motor housing. The wheel hub drive according to the invention can, therefore, be manufactured at very affordable costs. Beyond, the assembly has been simplified, as further steps for assembling the ring gear could have been omitted.

In still another preferred embodiment of the present invention, the planet gear is radially supported at its both opposing front sides in the planet carrier. Thus, very little frictional losses are generated in the planetary gear system. Accordingly, the planetary gear system has become more smooth-running, and the efficiency of the wheel hub drive according to the invention can be enhanced.

In still another especially preferred embodiment of the present invention, the planet gear is stepped and includes a first gear rim and a second gear rim, wherein the diameter of said first gear rim is larger than the diameter of said second gear rim and wherein said first gear rim meshes with the sun gear and said second gear rim meshes with the ring gear. Hence follows that large gear ratios can also be obtained by means of said single-stage planetary gear system. Most preferentially, said second gear rim of said planet gear is axially closer to the rotor of the electric motor than said first gear rim. Thus, an even still more compact design of the wheel hub drive according to the invention can be obtained. For both the motor housing and the hub housing less material is required. As a result, the motor housing is extremely short in the axial direction.

In still another especially preferred embodiment of the present invention, the drive of the planetary gear system is coupled to the hub housing by means of a freewheel clutch. Provided, the wheel hub drive is being used as an auxiliary drive for a bicycle, said freewheel clutch allows driving without any support by means of said auxiliary drive, wherein in such a case neither the motor nor the planetary gear system generate frictional losses. Owing to said freewheel clutch, any inconvenient braking effect of the auxiliary drive during a pedal-driven ride can be avoided.

In still another preferred embodiment of the present invention, the hub housing consists of multiple parts and is held together by means of detachable fastening elements, in particular screws. Thus, the hub housing can easily be opened for maintenance, service and wheel hub drive control purposes and for the replacement of wear parts.

In still another especially preferred embodiment of the present invention, a temperature sensor for monitoring the operating temperature of the electric motor is provided. This allows to load the motor in a controlled manner until it reaches its thermal limit and, if need be, to drive it even in the overload range for a short time. Thus, a high torque or a high power can temporarily be provided without running the risk that permanent damages are caused at either the wheel hub drive or the electric motor.

The wheel hub drive according to the invention is especially suited as a supporting drive of another drive, especially for a hybrid vehicle or a Pedal Electric Cycle. The wheel hub drive according to the invention can also be used as a bicycle rear wheel drive. Further possible applications are also conceivable.

In the following, one example of an embodiment of the present invention will be explained in detail with regard to the drawing.

FIG. 1 is a longitudinal sectional view of an electric wheel hub drive 1 according to the invention.

In the present example, the wheel hub drive 1 is an auxiliary bicycle drive. The wheel hub drive according to the invention substantially includes a pivot-mounted hub housing 3, a brushless electric motor for driving said hub housing, and a planetary gear system connected between said electric motor and said hub housing.

The pivot-mounted wheel hub housing 3 is made of aluminum and consists of three parts, viz. a hollow-cylindrical hub housing center part 22, a left hub housing cover 21 and a right hub housing cover 20. Said right and said left hub housing covers 20 and 21 are bolted together with said hub housing center part 22 by means of screws 18. Owing to the multiple-part design of hub housing 3, the wheel hub drive according to the invention can be dismounted easily for service or maintenance or repair purposes. Hub housing center part 22 normally includes two hub flanks 23 to which the spokes 24 of the rear wheel are applied. Pivot-mounting of hub housing 3 is done via two ball bearings, viz. the right ball bearing 25 between said right hub housing cover 20 and said stationary axis 2 and the left bearing 26 between said left hub housing cover 21 and also said stationary axis 2. Axis 2 is a commonly used, hollow-cylindrical rear wheel axis which is connected to the rear bicycle fork 5 of which only the left branch is shown. Quick releases or fasteners for fastening axis 2 to rear wheel fork 5 are also not shown. Between the wheel hub drive and the right fork branch the drive sprocket for the chain drive and, if need be, a brake disk are also provided on the same axis.

Hub housing 8 entirely encloses the electric motor and the planetary gear system. In the drawing, the electric motor is shown on the right side, the planetary gear system is shown axially following thereto on the left side of the drawing. Hub housing 8, electric motor and planetary gear system are concentrically arranged with regard to axis 2.

The electric motor includes a motor housing 8 that is non-rotatably mounted to stationary axis 2. The hollow-cylindrical housing 8 encloses the also hollow-cylindrical stator winding 7 which has been designed as an ironless stator winding. A yoke 22 composed of a plurality of ring-shaped sheets made of magnetically soft steel is arranged between said stator winding and said motor housing. Yoke 22 lies radially close against both the motor housing 8 and the stator winding 7 thus enabling the waste heat developing in said stator winding during operation of the electric motor to be dissipated outwards very quickly via the motor housing 8. Another measure for improving the heat transport will be described at a later time. Since the stator winding is of an ironless design, there is just very little core loss of the wheel hub drive according to the invention. The stator winding is of multi-pole design and includes circumferentially a plurality of windings overlapping each other which are alternately supplied with power by means of an electronic system (not shown). The overlapping windings of stator winding 7 are bonded to each other by means of an epoxy resin. The (not shown) electronic system used to apply power to the stator winding can be accommodated either outside or inside of the electric motor, for instance in the hollow space 31 in the right-hand region within motor housing 8. The electric connections are guided outwards through ports (not shown) provided in said stationary axis 2 through said axis.

Rotor 4 of the electric motor has been designed as an internal rotor and is, thus, enclosed by said stationary stator winding 7. The rotor is pivot-mounted by means of the two ball bearings 30 with regard to stationary axis 2. Multiple permanent magnets 6 are provided at the outer circumference of rotor 4 and are uniformly distributed over the circumference and alternately oppositely poled. Between permanent magnets 6 and stationary stator winding 7 there is a small air gap that is necessary for rotor 4 to be able to rotate. Motor housing 8 is open towards the left side where a small shaft journal of rotor 4 protrudes, the left end thereof forming sun gear 10 of the single-stage planetary gear system. The shaft journal or the sun gear may either be integrally formed with rotor 4, as shown, or non-rotatably mounted with the rotor.

Sun gear 10 meshes with a total of three planet gears 12, the upper of which being shown as a sectional view. The three planet gears are uniformly distributed over the circumference of the planetary gear system. The planet gears are stepped and each includes a first gear rim 15 of a larger diameter and a second gear rim 16 of a smaller diameter. First gear rim 15 with the larger diameter meshes with sun gear 10 of the rotor shaft, second gear rim 16 with the smaller diameter meshes with a ring gear 11 that is a part of motor housing 8. In order to obtain a compact structural design, the second gear rim of smaller diameter is closer to the electric motor, i.e. further to the right in the drawing, than the first gear rim 15 of larger diameter. All planet gears are pivot-mounted in a planet carrier via a planet axis 27, respectively, said carrier being formed by means of the two planet carrier disks 13 and 14. Planet gears 12 are supported or carried at both sides by said two planet carrier disks 13 and 14, thus reducing the friction in the planetary gear system. In the drawing, first planet carrier disk 13 is provided on the left side between planet gears 12 and left hub housing cover 21. It is pivot-mounted via an exterior ball bearing 29 with regard to the hub housing. Right planet carrier disk 14 provided between rotor 4 of the electric motor and planet gears 12 is also pivot-mounted, viz. via a bearing 28 that is arranged between the interior rotor shaft and planet carrier disk 14 enclosing the rotor shaft. Accordingly, the planet carrier can, in principle, freely rotate and that both with regard to the stator and the rotor of the electric motor and also to the hub housing 3. Yet, the planet carrier constitutes the output of the planetary gear system. To this end, the left planet carrier disk 13 is coupled to the left hub housing cover 21 by means of a freewheel clutch 17. Freewheel clutch 17 makes sure that the planet carrier meshes with the hub housing in just one direction of rotation. In the opposite direction of rotation, the hub housing can rotate freely with regard to the planet carrier.

To improve the heat transport of the waste heat of the electric motor, a thermo-conductive fluid is provided in gap 9 between motor housing 8 and the enclosing hub housing 3. The heat developing in stator winding 7 can, thus, dissipate outwards optimally via yoke 32, motor housing 8, the thermo-conductive fluid and hub housing 3. Furthermore, the electric motor includes a temperature sensor 19 that is directly located at stator winding 7. Temperature sensor 19 is connected to the electronic system (not shown) of the electric motor. Accordingly, the electric motor can be operated at maximum operating temperature in a controlled manner. Moreover, owing to such permanent temperature monitoring, the electric motor can, if need be, also be operated in the overload region for a short period of time. Hence follows that the wheel hub drive according to the invention is able to provide for a very high torque or a very high power over a short period of time without causing damage to the electric motor.

The invention claimed is:

1. An electric wheel hub drive for a vehicle, comprising:
   a hub housing pivot-mounted about an axis;
   a brushless electric motor coaxially arranged to said axis and including a rotor and a stator for driving the hub housing, wherein the stator includes a hollow-cylindrical stator winding, and wherein the rotor includes at least one permanent magnet and is arranged as an internal rotor radially within the stator winding, wherein the stator winding is a core-less stator winding and includes a plurality of windings circumferentially overlapping each other;
   a motor housing of the electric motor that encloses the stator winding;
   a magnetically soft yoke arranged between the stator winding and the motor housing; and
   a temperature sensor provided for monitoring an operating temperature of the electric motor, and the temperature sensor is located on the axial end of the yoke and the axial end of the stator winding, and the temperature sensor is in direct contact with the yoke and the stator winding.

2. The electric wheel hub drive according to claim 1, wherein a planetary gear system is provided interposed between the electric motor and the hub housing and coupled, at a driving end, to the rotor and, at an output end, to the hub housing.

3. The electric wheel hub drive according to claim 2, wherein the electric motor and the planetary gear system are at least partially enclosed by the hub housing.

4. The electric wheel hub drive according to claim 3, wherein a thermo-conductive fluid is provided in a gap between the motor housing and the hub housing, wherein both the hub housing and the motor housing include a material, at least in the region of the gap, of high thermal conductivity.

5. The electric wheel hub according to claim 4, wherein the hub housing and the motor housing consist of at least one of steel and aluminum.

6. The electric wheel hub drive according to claim 2, wherein the planetary gear system is single-staged, wherein said single-stage includes a sun gear non-rotatably mounted to the rotor or integrally formed with a rotor shaft of the rotor, a ring gear non-rotatably mounted to the stator, at least one planet gear meshing with the sun gear and the ring gear, and a planet carrier for carrying the at least one planet gear, wherein the planet carrier constitutes an output of the planetary gear system that is coupled to the hub housing.

7. The electric wheel hub drive according to claim 6, wherein the ring gear is formed by the motor housing.

8. The electric wheel hub drive according to claim 6, wherein the planet gear is radially supported at both of its opposing front sides in the planet carrier.

9. The electric wheel hub drive according to claim 6, wherein the planet gear is stepped and includes a first gear rim and a second gear rim, wherein a diameter of the first gear rim is larger than a diameter of the second gear rim, and wherein the first gear rim meshes with the sun gear and the second gear rim meshes with the ring gear.

10. The electric wheel hub drive according to claim 9, wherein the second gear rim is axially closer to the rotor of the electric motor than the first gear rim.

11. The electric wheel hub drive according to claim 2, wherein an output of the planetary gear system is coupled to the hub housing via a freewheel clutch.

12. The electric wheel hub drive according to claim 1, wherein the hub housing comprises several parts and is held together by means of detachable fastening elements.

13. The electric wheel hub according to claim 12, wherein the detachable fastening elements are screws.

14. The electric wheel hub drive according to claim 1, wherein the vehicle is a bicycle.

* * * * *